(12) United States Patent  
Vivanco et al.

(10) Patent No.: US 8,918,843 B1
(45) Date of Patent: Dec. 23, 2014

(54) DETECTING UNAUTHORIZED TETHERING

(75) Inventors: Daniel Vivanco, Reston, VA (US); Aik Chindapol, Washington, DC (US); Shahzada Rasool, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 60 days.

(21) Appl. No.: 13/365,510

(22) Filed: Feb. 3, 2012

(51) Int. Cl.
*H04L 29/06* (2006.01)

(52) U.S. Cl.
USPC .............................................. 726/4; 709/229

(58) Field of Classification Search
CPC ................................................... H04L 63/0876
USPC .............................................. 726/4; 709/229
See application file for complete search history.

(56) References Cited

U.S. PATENT DOCUMENTS

| | | | |
|---|---|---|---|
| 7,239,865 B2 | 7/2007 | Dyck et al. | |
| 2004/0049586 A1* | 3/2004 | Ocepek et al. | 709/229 |
| 2004/0139206 A1* | 7/2004 | Claudatos et al. | 709/229 |
| 2006/0153122 A1* | 7/2006 | Hinman et al. | 370/328 |
| 2009/0279543 A1 | 11/2009 | Strom et al. | |
| 2010/0103910 A1* | 4/2010 | Verma | 370/338 |
| 2010/0188975 A1* | 7/2010 | Raleigh | 370/230.1 |
| 2012/0014282 A1* | 1/2012 | Pappu et al. | 370/253 |
| 2012/0240197 A1* | 9/2012 | Tran et al. | 726/4 |

OTHER PUBLICATIONS

Sandvine, "Case Study: Sandvine Tethered Device Detection Solution and Service Revenue Enhancement", Apr. 14, 2011.*

* cited by examiner

*Primary Examiner* — Carl Colin
*Assistant Examiner* — Syed Zaidi

(57) ABSTRACT

In systems and methods of detecting unauthorized tethering by a wireless device, plurality of wireless devices in communication with an access node is detected, and a suspect device list of wireless devices which are not authorized for tethering is determined from among the plurality of detected wireless devices. Based on a resource usage pattern of the at least one wireless device, at least one wireless device is removed from the suspect device list. For each wireless device remaining on the suspect device list a software indicator is examined, and a list of wireless devices performing unauthorized tethering is created based on the examined software indicators.

16 Claims, 5 Drawing Sheets

DETECTING UNAUTHORIZED TETHERING

Wireless devices can provide access to wireless communication networks and to a wide range of services available through such communication networks. Wireless devices can also share their capability to access wireless networks with other devices, sometimes referred to as tethering. The use of wireless devices for unauthorized tethering is a major concern for network operators. While typical network resource consumption by a wireless device by itself is relatively small, unauthorized tethering can cause a significant increase in the usage of network resources, and can also contribute to network congestion having a negative impact to other network subscribers. Furthermore, unauthorized tethering creates unfairness among subscribers, since network operators typically allocate resources to subscribers who are authorized to perform tethering, but plan no such allocation for subscribers who are not authorized. Where, for example, communication bandwidth is allocated proportionally to the amount of data transferred, those wireless devices which are performing unauthorized tethering transmit and receive more data because they are supporting multiple devices, and unauthorized devices tend to demand greater services than those devices not performing tethering.

Overview

Systems and methods of detecting unauthorized tethering by a wireless device are provided. A plurality of wireless devices in communication with an access node is detected, and a suspect device list of wireless devices which are not authorized for tethering is determined from among the plurality of detected wireless devices. Based on a resource usage pattern of the at least one wireless device, at least one wireless device is removed from the suspect device list. For each wireless device remaining on the suspect device list a software indicator is examined, and a list of wireless devices performing unauthorized tethering is created based on the examined software indicators.

DETAILED DESCRIPTION

In an embodiment, a plurality of wireless devices in communication with an access node is detected, and a suspect device list of wireless devices which are not authorized for tethering is determined from among the plurality of detected wireless devices. Based on a resource usage pattern of the at least one wireless device, at least one wireless device is removed from the suspect device list. For each wireless device remaining on the suspect device list a software indicator is examined, and a list of wireless devices performing unauthorized tethering is created based on the examined software indicators. A data flow to the wireless device performing unauthorized tethering can be adjusted, reduced or blocked, to mitigate the impact on network resources of the unauthorized tethering.

Tethering refers to the sharing by a wireless device of its capability to access wireless networks with another device. An example of tethering is when a mobile phone which is enabled to access the Internet through a wireless communication network shares its network access capability with another device, for example, a laptop computer. A wireless device can be capable of sharing its network access with multiple additional devices. In any case, the wireless device and the additional device or devices share the network connection of the wireless device. The connection between the wireless device and the additional device can be made through a wired or wireless connection.

Unauthorized tethering is of great concern to network operators. It increases the consumption of network resources, such as bandwidth, and can also cause network congestion. With the advent of wireless devices capable of acting as a network access point, for example, as a WiFi hot spot, increasingly users are modifying wireless devices to enable such network access point feature without authorization from a network provider.

Figure 1:
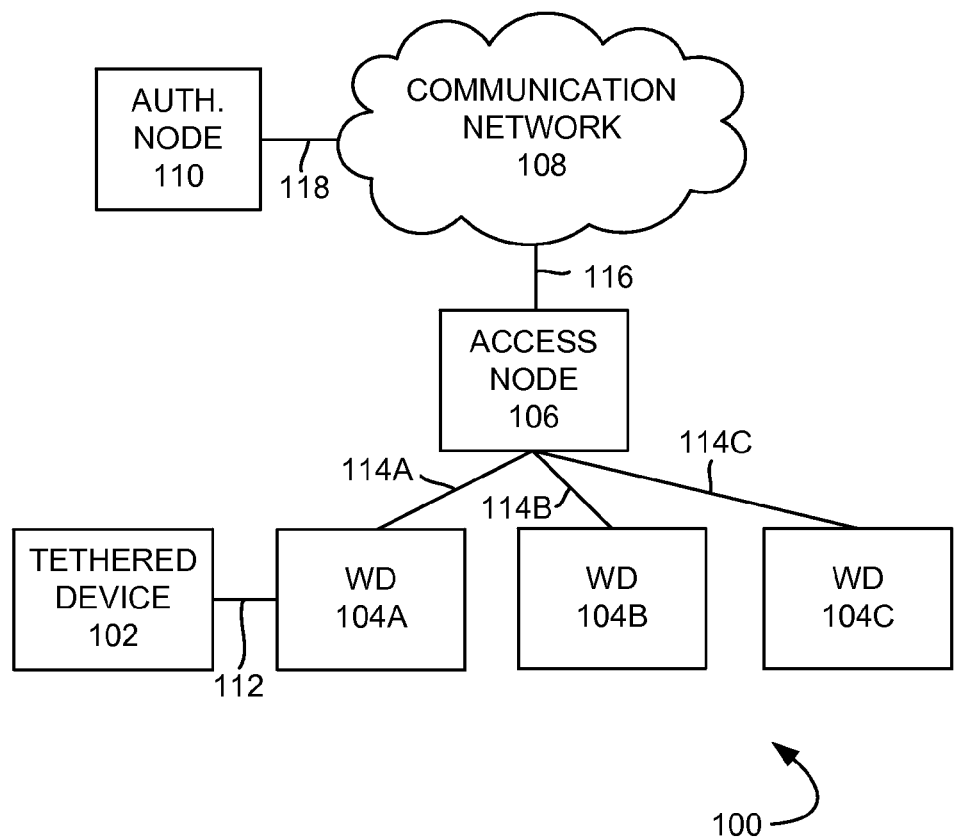
FIG. 1 illustrates an exemplary communication system to detect unauthorized tethering by a wireless device.

FIG. 1 illustrates an exemplary communication system 100 for detecting unauthorized tethering by a wireless device. Communication system 100 comprises tethered device 102, wireless devices 104A-104C, access node 106, communication network 108, and authorization node 110. Examples of a wireless device 104 can include a cell phone, a smart phone, a computing platform such as a laptop, palmtop, or tablet, a personal digital assistant, an internet access device, or other device capable of wireless communication, including combinations thereof. Examples of tethered device 102 can include a cell phone, a smart phone, a computing platform such as a laptop, palmtop, or tablet, a personal digital assistant, including combinations thereof. Wireless device 104A and tethered device 102 communicate over communication link 112.

Access node 106 is in communication with the wireless devices 104A-104C through communication links 114A-114C and with communication network 108 through communication link 116. Access node 106 is a network node capable of providing wireless communications to wireless devices 104A-104C, and can be, for example, a base transceiver station and an eNodeB device. While three wireless devices are illustrated in communication with access node 106 this is merely illustrative, and in operation any number of wireless devices may be in communication with access node 106.

Communication network 108 is in communication with authorization node 110 over communication link 118 and with access node 106 over communication link 116. Communication network 108 comprises base stations, wireless communication nodes, telephony switches, internet routers, network gateways, computer systems, communication links, or some other type of communication equipment, including combinations thereof.

Communication links 112, 114, 116 and 118 can be wired or wireless communication links. Wired communication links can be, for example, twisted pair cable, coaxial cable, fiber optic cable, or combinations thereof. Wireless communication links can be a radio frequency, microwave, infrared, or other similar signal, and can use a suitable communication protocol, for example, code division multiple access (CDMA) 1xRTT, Universal Mobile Telecommunications System (UMTS), High-Speed Packet Access (HSPA), Evolution Data Optimized (EV-DO), EV-DO rev. A, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 106, communication network 108 and authorization node 110 which are omitted for clarity, including additional processing nodes, routers, gateways, and physical and/or wireless data links for carrying data among the various network elements.

In operation, wireless devices 104A-104C in communication with access node 106 are detected, and from among the plurality of detected wireless devices a suspect list is determined of wireless devices which are not authorized for tethering. Based on resource usage patterns of the wireless devices, at least one wireless device is removed from the suspect device list. Of the remaining devices on the suspect device list, a software indicator for each wireless device is examined, and based on the examined software indicators an unauthorized device list is created of devices which are deemed to be performing unauthorized tethering.

Figure 2:
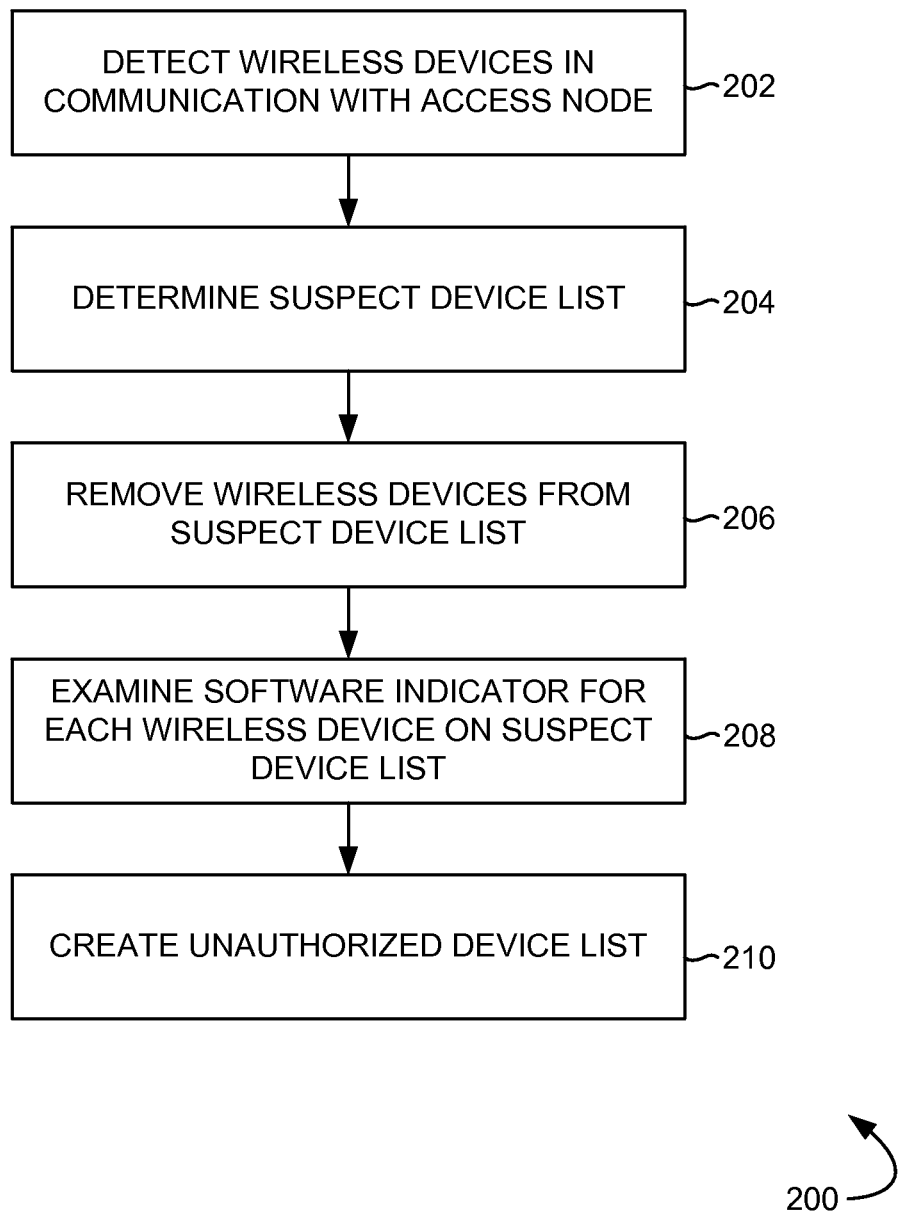
FIG. 2 illustrates an exemplary method of detecting unauthorized tethering by a wireless device.

FIG. 2 illustrates an exemplary method 200 of detecting unauthorized tethering by a wireless device. In operation 202, a plurality of wireless devices 104A-104C in communication with access node 106 are detected. For example, wireless devices 104A-104C can be authorized to access communication network 108 through access node 106, and can have at least one assigned channel of communication with access node 106. In an embodiment, access node 106 provides a list of wireless devices 104A-104C in communication with it, for example, a list of active devices comprising an Active_List or other similar indicator of wireless devices in communication with access node 106. A utilization of network resources by wireless devices 104A-104C can also be provided. For example, utilization by each wireless device 104A-104C of communication links 114A-114C can be provided for each wireless device, as can an indication of applications running on each wireless devices which are sending, receiving, or requesting data from communication network 108 through access node 106.

In operation 204, a suspect device list of wireless devices which are not authorized for tethering is determined from among the plurality of wireless devices 104A-104C. Based on the determined list of wireless devices 104A-104C in communication with access node 106, a determination can be made of which detected wireless devices are capable of tethering and which are also not authorized to perform tethering. For example, wireless devices 104A-104C can each be so identified, and thus considered suspect devices. In an embodiment, authorization node 110 can be queried based on the detected wireless devices in communication with access node 106, and authorization node 110 can provide capability and authorization information about each of wireless device 104A-104C. Such information can also be provided by another network node such as a home locator register or visitor location register, or by some other similar network node.

Based on a resource usage pattern, at least one of the wireless devices 104A-104C is removed from the suspect device list (operation 206). When a utilization of network resources by wireless devices 104A-104C is provided, the utilization can be examined for indications that a wireless device is or is not performing tethering. For example, utilization by each wireless device 104A-104C of communication links 114A-114C can provide an indication of resource utilization which is inconsistent with utilization typical of a single wireless device. On the other hand, if a resource usage of a wireless device is consistent with expectations for a single wireless device, this indication can be used to remove a wireless device from the suspect device list. Similarly, an indication of an application or applications running on a wireless device, and/or the type and volume of data, as well as the frequency of data transmissions or requests, can indicate that the detected wireless device is or is not performing tethering. For example, a resource usage pattern can include a transmitted or requested data volume, or a transmission or request frequency, which meets a data volume threshold or a data frequency threshold.

Thus, when a resource usage pattern for wireless device 104C is typical of an expected resource usage pattern for a single wireless device, wireless device 104C is removed from the suspect device list. On the other hand, a resource usage pattern for wireless device 104A may indicate a volume of data or a request frequency which is not typical of a single wireless device. From the resource usage pattern of wireless device 104A, it can be inferred that wireless device 104A may be performing tethering, and so wireless device 104A remains on the suspect device list.

In operation 208, a software indicator is examined for each wireless device remaining on the suspect device list. Data sent from remaining wireless devices 104A and 104B can be examined for a software indicator which provides an indication of software which is sending or requesting data. In an embodiment, a software indicator can indicate that a user agent such as a web browser which is not typically used on a wireless device sent a data request. For example, data received from wireless device 104A can comprise a software indicator which, when examined, indicates that the Mozilla Firefox web browser sent or requested data. If the Firefox web browser is known to be typically unavailable for use on wireless devices, wireless device 104A is determined to be performing tethering. As another example, data received from wireless device 104B can comprise a software indicator which indicates that a web browser known to be used on wireless devices initiated the data. Accordingly, wireless device 104B is determined not to be performing tethering.

In operation 210, an unauthorized device list is created, comprising wireless devices in communication with access node 106 which are determined to be performing unauthorized tethering. For example, wireless device 104A was determined to be performing tethering based on its resource usage pattern as well as the software indicator examined in data sent from wireless device 104A. Since wireless device 104A was also found to be unauthorized to perform tethering, wireless device 104A is determined to be performing unauthorized tethering, and wireless device 104A is added to the unauthorized device list. On the other hand, wireless device 104B, which was determined to not be performing unauthorized tethering, is not added to the unauthorized device list.

Figure 3:
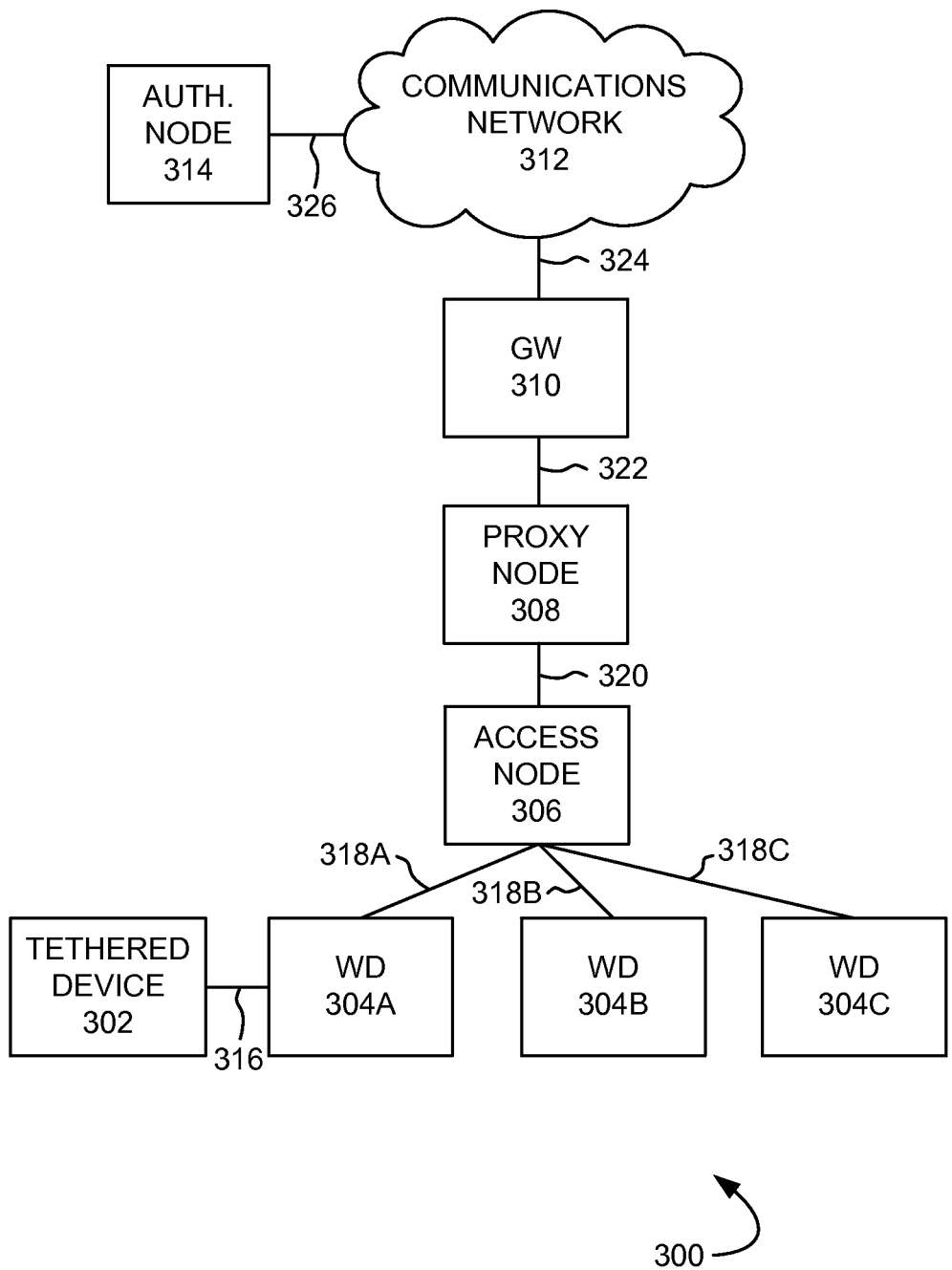
FIG. 3 illustrates another exemplary communication system to detect unauthorized tethering by a wireless device.

FIG. 3 illustrates another exemplary communication system 300 to detect unauthorized tethering by a wireless device. Communication system 300 comprises tethered device 302, wireless devices 304A-304C, access node 306, proxy node 308, gateway 310, communication network 312 and authorization node 314. Examples of a wireless device 304 can include a cell phone, a smart phone, a computing platform such as a laptop, palmtop, or tablet, a personal digital assistant, an internet access device, or other device capable of wireless communication, including combinations thereof. Examples of tethered device 302 can include a cell phone, a smart phone, a computing platform such as a laptop, palmtop, or tablet, a personal digital assistant, including combinations thereof. Wireless device 304A and tethered device 302 communicate over communication link 316.

Access node 306 is in communication with the wireless devices 304A-304C through communication links 318A-318C and with proxy node 308 through communication link 320. Access node 306 is a network node capable of providing wireless communications to wireless devices 304A-304C, and can be, for example, a base transceiver station and an eNodeB device. While three wireless devices are illustrated in communication with access node 306, this is merely illustrative, and in operation any number of wireless devices may be in communication with access node 306.

Proxy node 308 is in communication with access node 306 through communication link 320 and with gateway 310 through communication link 322. Proxy node 308 can serve as an intermediary network element between wireless device 304A-304C and communications network 312. Among other things, proxy node 308 can process a suspect device list, remove at least one wireless device from the suspect device list based on a resource usage pattern of the at least one wireless device, examine a software indicator for each wireless device remaining on the suspect device list, and create an unauthorized device list of wireless devices based on the examined software indicators, as further described below.

Gateway 310 is in communication with proxy node 308 through communication link 322 and with communications network through communication link 324. Gateway 310 can detect a plurality of wireless devices in communication with an access node and determine from among the plurality of detected wireless devices a suspect device list of wireless devices which are not authorized for tethering. In an embodiment, gateway 310 can also process a suspect device list, remove at least one wireless device from the suspect device list based on a resource usage pattern of the at least one wireless device, examine a software indicator for each wireless device remaining on the suspect device list, and create an unauthorized device list of wireless devices based on the examined software indicators, as further described below. The functions of proxy node 308 and gateway 310 may combined in whole or in part in one network node, or they may be distributed between the proxy node 308 and gateway 310 differently in various embodiments.

Communication network 312 is in communication with authorization node 314 over communication link 326 and with gateway 310 over communication link 324. Communication network 312 and authorization node 314 are analogous to communication network 108 and authorization node 110, respectively. Communication links 316, 318A-318C, 320, 322, 324 and 326 can be wired or wireless communication links, and are analogous to communication links 112, 114A-114C, 116 and 118. Further description thereof is omitted for brevity.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 306, proxy node 308, gateway 310, communication network 312 and authorization node 314, which are omitted for clarity, including additional processing nodes, routers, gateways, and physical and/or wireless data links for carrying data among the various network elements.

Figure 4:
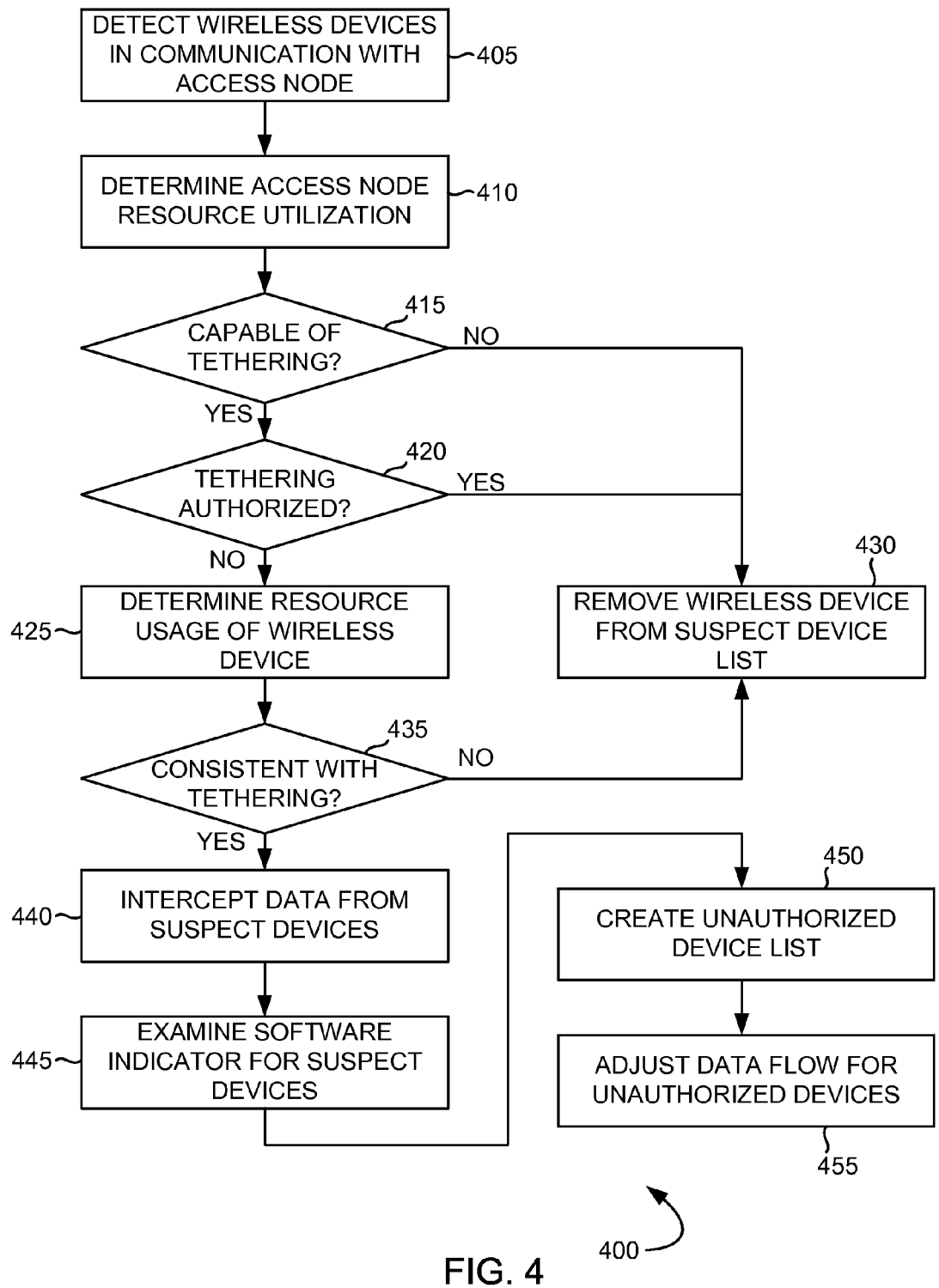
FIG. 4 illustrates another exemplary method of detecting unauthorized tethering by a wireless device.

FIG. 4 illustrates another exemplary method 400 of detecting unauthorized tethering by a wireless device. In operation 405, a plurality of wireless devices 304A-304C in communication with access node 306 are detected. For example, wireless devices 304A-304C can be authorized to access communication network 312 through access node 306, and can have at least one assigned channel of communication with access node 306. In an embodiment, access node 306 provides a list of wireless devices 304A-304C in communication with it, for example, a list of active devices comprising an Active_List or other similar indicator of wireless devices in communication with access node 306, to proxy node 308 or to gateway 310. In operation 410, a utilization of network resources by wireless devices 304A-304C can also be provided. For example, utilization by each wireless device 304A-304C of communication links 318A-318C can be provided for each wireless device in communication with access node 306, as well as an indication of applications running on each wireless devices which are sending, receiving, or requesting data from communication network 312 through access node 306.

Based on the determined list of wireless devices 304A-304C in communication with access node 306, a determination can be made of which detected wireless devices are capable of tethering and which are also not authorized to perform tethering. In an embodiment, proxy node 308 or gateway 310 can query authorization node 314 based on the detected wireless devices in communication with access node 306, and authorization node 314 can provide capability and authorization information about each of wireless devices 304A-304C. Such information can also be provided by another network node such as a home locator register or visitor location register, or by some other similar network node. In operation 415, a list of wireless devices which are capable of performing tethering is determined from among the plurality of wireless devices 304A-304C. When a wireless device is not capable of performing tethering (operation 415—NO), it is removed from a suspect device list (operation 430). When a wireless device is capable of performing tethering (operation 415—YES), then it is determined whether the wireless device is authorized to perform tethering (operation 420). When a wireless device is authorized to perform tethering (operation 420—YES), then it is removed from the suspect device list (operation 430).

In operation 425, the resource usage of the wireless devices which are capable of tethering but not authorized to do so is determined. Based on a resource usage pattern, at least one of the wireless devices 304A-304C can be removed from the suspect device list (operation 430). For example, a resource usage pattern for wireless device 304C may be typical of an expected resource usage pattern for a single wireless device, and so wireless device 304C can be removed from the suspect device list.

On the other hand, a resource usage pattern for a wireless device may be inconsistent with resource usage patterns of a single wireless device (operation 435-YES), and the wireless device would not be removed from the suspect device list. For example, the resource usage pattern for wireless device 304A may indicate a volume of data or a request frequency which is not typical of a single wireless device. From the resource usage pattern of wireless device 304A, it can be inferred that wireless device 304A may be performing tethering, and so wireless device 304A remains on the suspect device list.

In an embodiment, access node 306 can provide an indication of resource utilization to proxy node 308 or gateway 310. In another embodiment, proxy node 308, or gateway 310, or another network element can determine the resource usage of the wireless devices on the suspect device list, and can provide the determination of the resource utilization to another network element. In operation, the utilization is examined for an indication that a wireless device is or is not performing tethering. For example, utilization by each wireless device 304A-304C of communication links 318A-318C can provide an indication of resource utilization which is inconsistent with utilization typical of a single wireless device, or which is consistent with expectations for a single wireless device. For example, an indication of an application or applications running on a wireless device, and/or the type and volume of data, and/or the frequency of data transmissions or requests, can indicate that the detected wireless device is or is not performing tethering. A resource usage pattern can include a transmitted or requested data volume, or a transmission or request frequency, which meets a data volume threshold or a data frequency threshold.

In operation 440, data is received from each of the wireless devices remaining on the suspect device list, and in operation 445 a software indicator is examined for each remaining wireless device. Data can be received at the proxy node 308 or at the gateway 310, or at another network element capable of receiving data from the wireless devices 304A and 304B. In operation, data sent from wireless devices 304A and 304B (which remain on the suspect device list) can be examined for a software indicator which provides an indication of software which sent or requested data. Data from a wireless device can be filtered to reduce the overall overhead of examining software indicators of received data. In an embodiment, application layer data traffic can be filtered based on destination port, such as port 80 (which is typically used for hypertext transfer protocol (HTTP) traffic), to reduce the amount of data examined.

An example of examining data received from wireless device 304A and 304B includes examining data to determine information about a user agent or other client software in use by a wireless device. According to a communication protocol, a user agent can include in a data request information identifying itself, and can also include information such as its application type and the operating system of the wireless device. The information can be located, for example, in a header of data sent by the wireless device, such as a packet header like an HTTP header (which can be encapsulated in a transfer control protocol (TCP) header). Data received from wireless device 304A can comprise a software indicator which, for example, when examined indicates that the Mozilla Firefox web browser sent or requested data (an example of which is the user agent field in an HTTP header). For example, since the Firefox web browser is known to be typically unavailable for use on wireless devices (such as for example, wireless devices using certain operating systems, such as Android), wireless device 304A can be determined to be performing tethering. As another example, the software indicator can indicate an operating system which is being used by the wireless device. When the software indicator indicates an operating system which is not typically used by a wireless device (i.e., is unavailable to a wireless device), wireless device 304A can be determined to be performing tethering. As a further example, data received from wireless device 304B can comprise a software indicator which indicates that a web browser known to be used on wireless devices initiated the data, and/or that wireless device 304B is using an operating system known to be used by wireless devices. Accordingly, wireless device 304B can be determined not to be performing tethering.

In operation 450, an unauthorized device list is created, comprising wireless devices in communication with access node 306 which are determined to be performing unauthorized tethering. For example, wireless device 304A was determined to be performing tethering based on its resource usage pattern as well as the software indicator examined in data sent from wireless device 304A. Since wireless device 304A was also determined to be unauthorized to perform tethering, wireless device 304A is determined to be performing unauthorized tethering, and 304A is added to the unauthorized device list. On the other hand, wireless device 304B, which was determined to not be performing unauthorized tethering, is not added to the unauthorized device list.

In operation 455, the data flow for wireless devices on the unauthorized device list is adjusted. The data flow can be adjusted in various ways. For example, the data flow to a wireless device can be reduced to a threshold data flow, to preserve network resources for authorized devices. The threshold can be an average network usage. As one example, considering all of the wireless devices in communication with access node 306, if on average a wireless device uses 5% of network resources, then the threshold can be determined to be 5% of available resources, and a usage cap at the threshold can be imposed on unauthorized wireless devices accordingly. Thus, the impact on network utilization of devices performing unauthorized tethering can be mitigated. The data flow to the wireless device can also be terminated. In addition, an amount of data sent to and/or received from a wireless device can be limited to a threshold amount of data per unit time. Also, an amount of time which a wireless device is permitted to access the communication network 312 can be limited to a period of time.

Further, in addition to reducing the data flow to a threshold, a notification can be provided to the wireless device that its unauthorized tethering has been detected, and that the reduction in data flow will be imposed until an indication is received that a subscription for tethering services has been entered into by a user. An opportunity to subscribe to tethering services can also be provided to the wireless device. For example, a web page or portal page can be presented to the wireless device to provide an opportunity to adjust a subscription or to sign up for tethering services. In such case, the data flow to a wireless device can be reduced to a threshold until a subscription confirmation is received, for example, from the wireless device, or from authorization node 314. Similarly, the data flow can be reduced to zero pending receipt of a subscription confirmation.

Figure 5:
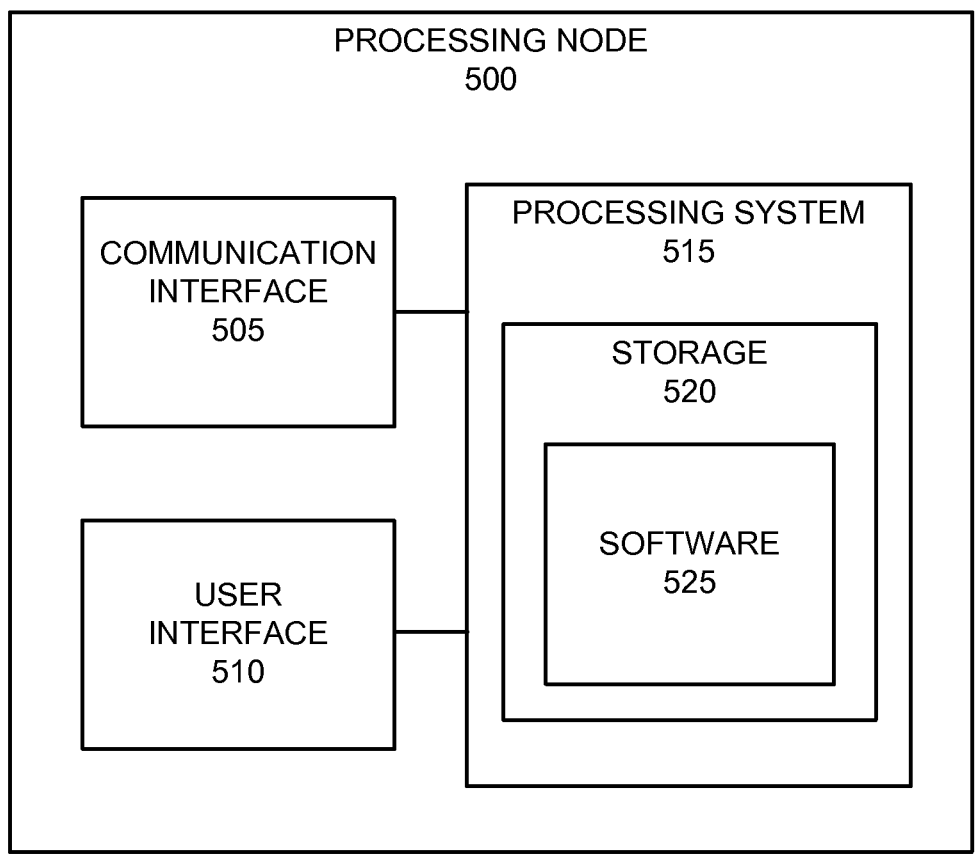
FIG. 5 illustrates an exemplary processing node.

FIG. 5 illustrates an exemplary processing node 500 in a communication system. Processing node 500 comprises communication interface 505, user interface 510, and processing system 515 in communication with communication interface 505 and user interface 510. Processing node 500 is capable of detecting unauthorized tethering by a wireless device. Processing system 515 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 525 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, etc., which are omitted for clarity. Communication interface 505 permits processing node 500 to communicate with other network elements. User interface 510 permits the configuration and control of the operation of processing node 500.

Examples of processing node 500 include proxy node 308 and gateway 310. Processing node can also be an adjunct or component of a network element, such as an element of access node 106 or access node 306. Processing node 500 can also be another network element in a communication system.

The exemplary systems and methods described herein can be performed under the control of a processing system executing computer-readable codes embedded on a computer-readable recording medium or on communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of detecting unauthorized tethering by a wireless device, comprising:
    detecting by a network node a plurality of first wireless devices, wherein each of the first wireless devices is in communication with an access node over a communication link;
    determining by the network node from among the plurality of detected first wireless devices a suspect device list of first wireless devices which are capable of tethering and are not authorized for tethering, wherein tethering comprises establishing a second communication link with a second wireless device and enabling the second wireless device to communicate with the access node using the communication link between one of the first wireless devices and the access node;
    determining by the network node a resource usage of each of the first wireless devices in the suspect device list;
    removing by the network node at least one first wireless device from the suspect device list based on the determined resource usage of the at least one first wireless device;
    examining by the network node a software indicator for each first wireless device remaining on the suspect device list; and
    creating by the network node an unauthorized device list from the first wireless devices remaining on the suspect device list based on the examined software indicators.

2. The method of claim 1, wherein detecting by the network node the plurality of first wireless devices further comprises:
    determining an access node resource utilization.

3. The method of claim 1, wherein examining the software indicator further comprises:
    examining a data header of data sent from each first wireless device on the suspect device list.

4. The method of claim 3, further comprising:
    determining based on the data header a software indicator for each first wireless device on the suspect device list to determine whether each first wireless device is sending or receiving data for software which is unavailable to the first wireless device.

5. The method of claim 3, further comprising:
    determining based on the data header a software indicator for each first wireless device on the suspect device list to determine whether each first wireless device is sending or receiving data for an operating system which is unavailable to the first wireless device.

6. The method of claim 1, further comprising:
    adjusting a data flow for each first wireless device on the unauthorized device list.

7. The method of claim 6, wherein adjusting a data flow further comprises at least one of reducing a data flow below a first threshold, limiting an amount of data, limiting a time of a connection, limiting a time of a session, and reducing a data flow below a second threshold until a subscription confirmation is received.

8. The method of claim 7, wherein the first threshold and the second threshold are an average network usage.

9. A system for detecting unauthorized tethering by a wireless device, comprising:
    an authorization node and a network node, the network node being configured to:
        detect a plurality of first wireless devices, wherein each of the first wireless devices is in communication with an access node over a communication link;
        determine from among the plurality of detected first wireless devices a suspect device list of first wireless devices which are capable of tethering and are not authorized for tethering by receiving capability and authorization information from the authorization node, wherein tethering comprises establishing a second communication link with a second wireless device and enabling the second wireless device to communicate with the access node using the communication link between one of the first wireless devices and the access node;
        determine a resource usage of each of the first wireless devices in the suspect device list;
        remove at least one first wireless device from the suspect device list based on the determined resource usage of the at least one first wireless device;
        examine a software indicator for each first wireless device remaining on the suspect device list, and
        create an unauthorized device list from the first wireless devices remaining on the suspect device list based on the examined software indicators.

10. The system of claim 9, wherein the network node is further configured to determine an access node resource utilization.

11. The system of claim 9, wherein the network node is further configured to examine a data header of data sent from each wireless device on the suspect device list.

12. The system of claim 11, wherein the network node is further configured to determine based on the data header a software indicator for each wireless device on the suspect device list to determine whether each wireless device is sending or receiving data for software which is unavailable to the wireless device.

13. The system of claim 11, wherein the network node is further configured to determine based on the data header a software indicator for each wireless device on the suspect device list to determine whether each wireless device is sending or receiving data for an operating system which is unavailable to the wireless device.

14. The system of claim 9, wherein the network node is further configured to adjust a data flow for each wireless device on the unauthorized device list.

15. The system of claim 14, wherein adjusting the data flow further comprises at least one of reducing a data flow below a first threshold, limiting an amount of data, limiting a time of a connection, limiting a time of a session, and reducing a data flow below a second threshold until a subscription confirmation is received.

16. The system of claim 15, wherein the first threshold and the second threshold are an average network usage.

\* \* \* \* \*